Sept. 9, 1941.  W. B. EWING  2,255,581

SCREEN FRAME WEDGE RETAINER ASSEMBLY

Filed Jan. 26, 1940

Inventor:
Walkley B. Ewing
By: Edward C. Gritzbaugh
Atty.

Patented Sept. 9, 1941

2,255,581

UNITED STATES PATENT OFFICE 2,255,581

SCREEN FRAME WEDGE RETAINER ASSEMBLY

Walkley B. Ewing, Grand Rapids, Mich., assignor, by mesne assignments, to Borg-Warner Corporation, Chicago, Ill., a corporation of Illinois Application January 26, 1940, Serial No. 315,712

5 Claims. (Cl. 156—14)

This invention relates to screen and supporting frame assemblies and particularly to a novel arrangement for retaining the end portions of the screen within the embracing frame.

It is an object to provide an improved construction of screen gripping members and cooperating frame for retaining the ends of the screen within the end frame members under tension.

Still another object is the provision of an arrangement of the above type providing for retaining the ends of the screen within the frame in its normal straight undistorted form.

Another object is the provision of an arrangement of the above type particularly adaptable for use in connection with screen having ribbon-like elements woven therein providing light ray control and optical properties, the retaining arrangement being effective to maintain the ribbon-like elements in their normal position, thus preserving these properties.

Other and more particular objects, advantages and uses of my invention will become apparent from a reading of the following specification taken in connection with the drawing which forms a part thereof and wherein.

Figure 1:
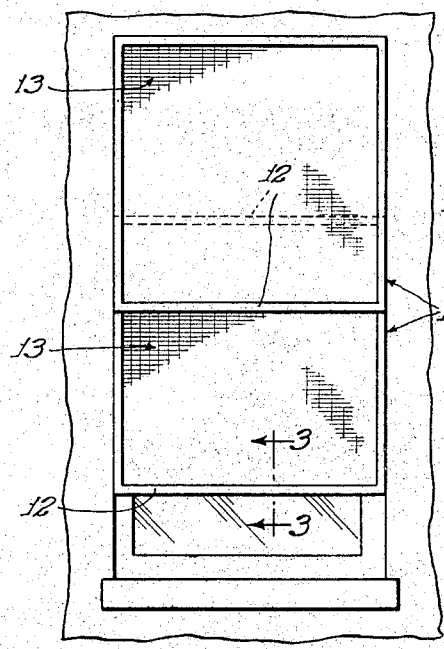
Fig. 1 shows a window installation incorporating certain preferred embodiments of my invention.

Referring to the drawing, there is shown in Fig. 1 an installation of my invention in a window, including upper and lower screen frames referred to generally at 11 and comprising upper and lower frame members 12 between which there is supported under tension in a novel manner a piece of screen material 13.

Figure 2:
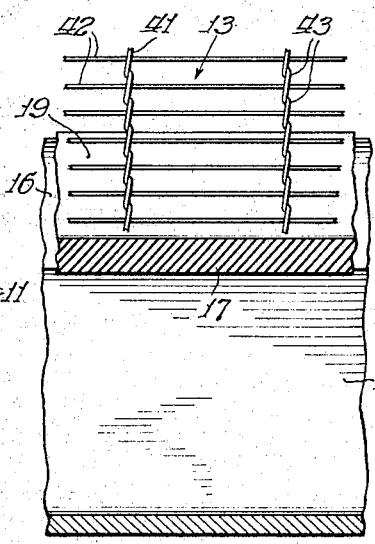
Fig. 2 is a cross-section view of a preferred form of my invention taken substantially on the line 2—2 of Fig. 3.
Figure 3:
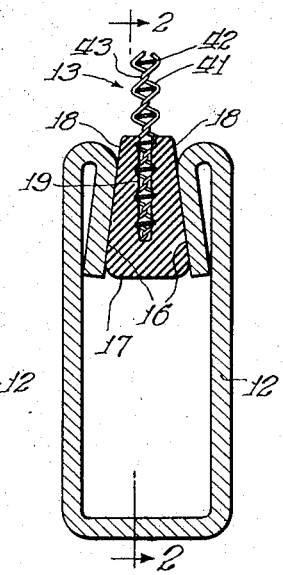
Fig. 3 is a cross-section of the modification shown in Fig. 2 and is taken substantially on the line 3—3 of Fig. 1.

Turning to Figs. 2 and 3 there is shown an enlarged cross-section of one of the identical screen members 12 and the associated screen 13. Generally speaking, my invention comprises the provision of a hollow frame member formed with outwardly converging side wall portions defining a jaw in which there is received a wedge-shaped gripping member engaging the edge of the screen in a manner such that any increase in the pull on the screen tends to cause the wedge to engage the periphery of the screen increasingly in proportion to this pull. This invention has application wherever it is important to maintain the screen material under tension and has particular application to the problem of supporting the type of screen disclosed in view of the light control and optical properties of this screen which in turn are dependent upon the precise angle at which the flat or ribbon-like elements are held. Specifically, I have shown in Figs. 2 and 3, lower frame member 12 as comprising a channel member having inwardly turned portions defining converging surfaces 16 which form a gripping jaw for receiving a wedge grip or retainer member 17 therebetween with converging surfaces 18 defining a wedge exterior. This wedge is preferably formed with a substantially straight mouth portion 19 opening in the direction of and receiving the peripheral portion of screen 13. While in certain installations it may be possible to obtain a sufficient gripping action by having the wedge engage the end of the screen on one side only, I nevertheless prefer the use of the above described substantially straight mouth portion 19, because of the more effective gripping and retaining action resulting therefrom. Wedge grip or retainer 17 is preferably formed of rubber or other composition material having sufficient flexibility to adapt it to the present use. The wedge retaining elements may be composed of a number of different materials so long as this material possesses the property of undergoing the proper change in shape when placed under pressure of the wedging action for accommodating the contacting portion of the woven screen material for the purpose of gripping the same. While a material having electrical insulation properties is preferred, this property is not necessarily controlling.

Figure 4:
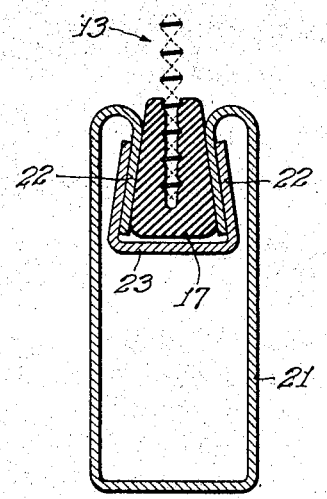
Fig. 4 is a view corresponding to Fig. 3 illustrating an alternative preferred embodiment of my invention.
Figure 5:
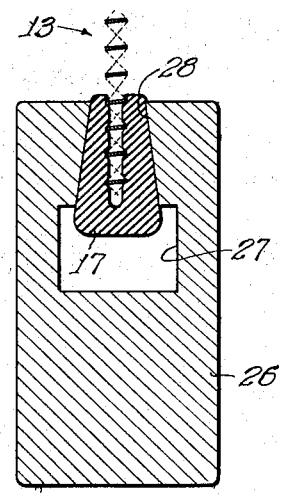
Fig. 5 shows still another embodiment of my invention.
Figure 6:
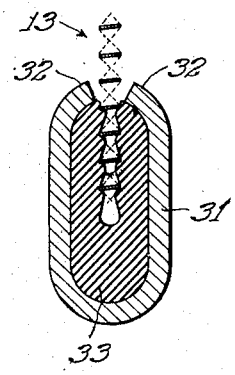
Fig. 6 shows still another alternative form of my invention.

As will be seen from the description of Figs. 4, 5 and 6, a number of alternative forms of frame constructions are available within the teaching of my invention so long as the important controlling factors are provided for. I have found these factors to include the provision of a wedge-like retainer or gripping means capable of holding the peripheral portion of the material without distorting or otherwise moving the edge portion substantially out of the normal plane of the screen, this gripping arrangement being responsive to a pull on the screen to increase the gripping or retaining action.

Referring to Fig. 4, a metal channel frame member 21 has inwardly turned portions 22 similar to those portions of the channel frame member shown in Fig. 3, but in view of the thinner material from which this channel frame member is made, a reinforcing member 23 is slipped over the end portion 22 to prevent the same from spreading when a pull on the screen 13 tends to remove retainer 17 therefrom.

In Fig. 5 there is indicated a form of lower frame member that may well be made of wood or other composition of general rectangular cross-section formed with a longitudinally extending channel 27 in the upper wall of which is formed a converging jaw 28 for cooperation with wedge grip or retainer 17 in the same manner as described in the preceding figures.

Turning to Fig. 6, there is shown an elongated tubular type frame section 31 having spaced apart converging ends 32 through which the peripheral portion of the screen 13 is extended into the mouth portion of gripping jaw 33, pull on the screen material being effective to cause an increase in the gripping action of the jaw 33 by virtue of the inner periphery of the converging end wall portions 32.

I have found that the present invention has unusual advantages when used in connection with the particular screen shown to advantage in Figs. 2 and 3 and including spaced pairs of longitudinally extending warp wires 41 and evenly spaced parallel ribbon-like transverse filler wires 42 held between the warp wires by means of integral twist 43 which are effective to hold the ribbon-like wires with their major surfaces disposed at a predetermined angle to the plane of the screen, thus incorporating in the screen certain desirable optical as well as sun ray controlling characteristics. The form of retainer structures disclosed are effective to hold the peripheral portion of the screen when introduced straight into the frame without distorting the same, thus maintaining the proper angular disposition of the ribbon-like members not only in the central portion of the screen but at the position where the screen enters the gripping jaw thus preserving both the optical and the sunray controlling properties of the screen.

While I have disclosed my invention in connection with certain specific embodiments thereof, these are to be considered by way of example and my invention is defined by the appended claims which should be given a scope as broad as permitted by the prior art.

I claim:

1. In a supporting frame and retaining assembly adapted for screens having longitudinal resilience, an end frame member formed with an elongated recess opening inwardly in the general direction of the plane of said screen, an end portion of said screen extending substantially straight into said recess with said end portion substantially in the normal plane of said screen and means interposed between said end portion and said elongated recess effective to retain said end portion within said recess under tension while maintaining the same substantially in the normal plane of said screen, said means comprising a gripping member having a wedge-shaped exterior portion and formed with a mouth portion, said recess formed within said end frame member being complementary in shape to said wedge portion, said end portion of said screen being received within said mouth portion and gripped thereby.

2. In an arrangement for retaining the screen material in a frame member under tension, comprising means defining a wedge shaped gripping member including an inwardly extending mouth portion for receiving the end of said screen material extended substantially straight therein, said wedge gripping member having exterior converging side walls, and said end frame member being formed internally with a pair of opposed converging walls defining a jaw member, said wedge gripping member being received within said jaw member and cooperating therewith in response to a pull upon said screen to cause said mouth portion to hold the end portion of said screen.

3. A window screen assembly including a piece of longitudinally resilient screen composed of a plurality of pairs of longitudinally extending warp wires and a plurality of parallel ribbon-like filler wires disposed with their major surfaces at a predetermined angle to the normal plane of the screen and held in position by integrating twists between said warp wires, end frame members for holding the end portions of said screen under tension, said frame members each being formed with an elongated recess opening inwardly in the direction of the plane of said screen, the end portions of said screen extending substantially straight into said recesses and being retained substantially in the normal plane of said screen, and means interposed between said end portions and the walls of said recesses effective to prevent withdrawal of said end portions from said recesses, said means comprising wedge-shaped members each having a mouth portion received about an end portion of said screen, the walls of said recesses being formed complementary to the wedge-shaped exterior of said wedge-shaped member whereby a pull on said screen tending to withdraw said end portions becomes effective to cause said mouth portion to close more tightly about the end portion of said screen.

4. A window screen assembly including a piece of longitudinally resilient screen composed of a plurality of pairs of longitudinally extending warp wires and a plurality of parallel ribbon-like filler wires disposed with their major surfaces at a predetermined angle to the normal plane of the screen and held in position by integrating twists between said warp wires, end frame members for supporting and holding the end portions of said screen under tension, said frame members being formed respectively with an elongated recess opening inwardly in the direction of the plane of said screen and defined in part by side walls converging in the direction of the central portion of said screen, the end portions of said screen extending substantially straight into said respective recesses and being maintained substantially in the normal plane of said screen and means interposed between the end portions of said screen and the walls of said recesses to hold said end portions in the normal plane of the screen and prevent the withdrawal thereof from said recesses, said means comprising resilient gripping members embracing the end of said screen, said gripping members being formed on the exterior thereof with a pair of converging side wall portions complementary to the side wall portions of said recesses and formed with a mouth portion extending inwardly between said side portions for receiving the end portions of said screen therein, a pull on said screen causing said ribbon-like filler wires to bite into the side walls of said mouth while the converging side walls of said gripping member cooperate with the converging side walls of said recess to cause said mouth portion to grip said screen in proportion to the pull thereon, while retaining the same within the normal plane of the screen.

5. In an arrangement for retaining the peripheral portion of a piece of screen material in a frame member, means for tightly engaging said peripheral portion of said screen on each side thereof, said means being provided with exterior surfaces at least one of which converges in the direction of the normal plane of the screen, said frame member being formed internally with an elongated recess opening inwardly in the general direction of the plane of said screen, and defined in part by a pair of complementary wall surfaces for cooperation with said surfaces of said griping means, whereby a pull on said screen is effective to cause said gripping means to engage said screen more tightly and thus prevent withdrawal of the same from said frame member.

WALKLEY B. EWING.